L. DE FOREST.
MEANS FOR AMPLIFYING CURRENTS.
APPLICATION FILED JUNE 24, 1913.

1,375,447.

Patented Apr. 19, 1921.
2 SHEETS—SHEET 1.

Witnesses
Lee de Forest Inventor

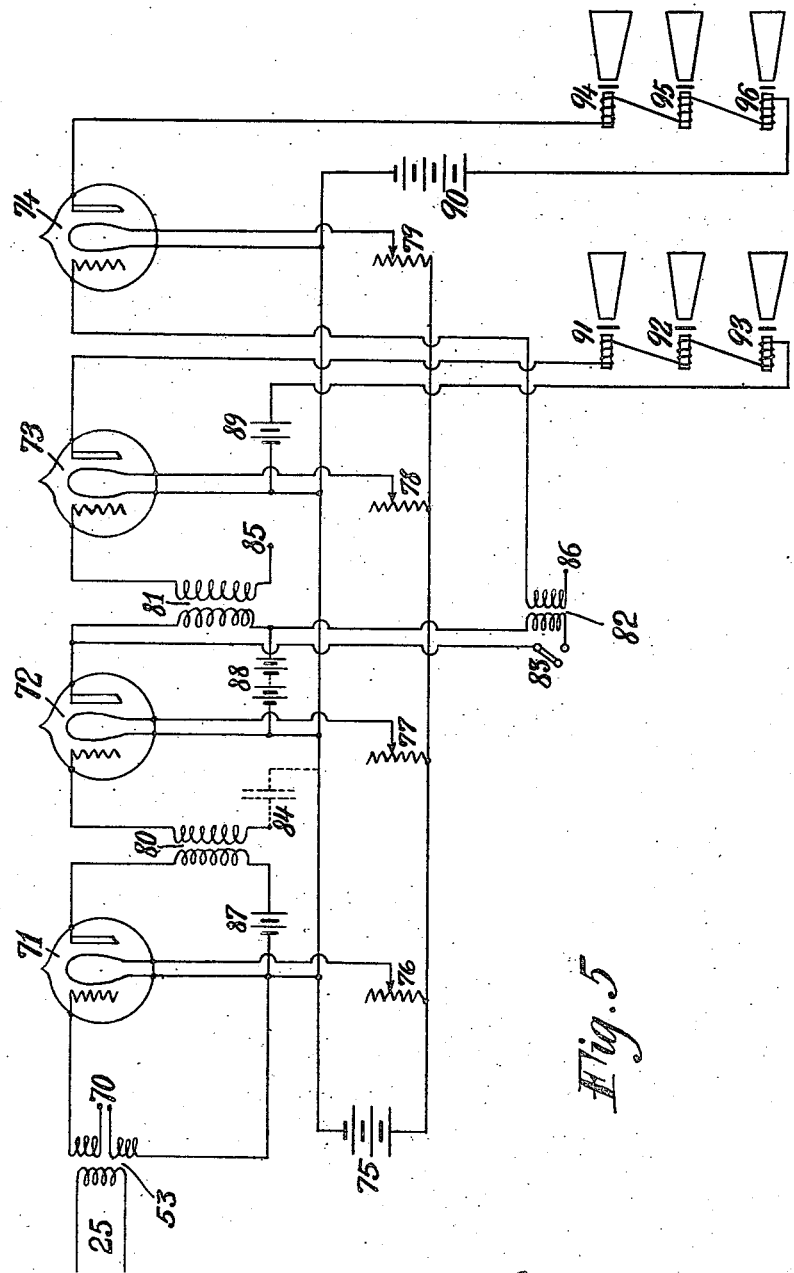

UNITED STATES PATENT OFFICE.

LEE DE FOREST, OF NEW YORK, N. Y., ASSIGNOR, BY MESNE ASSIGNMENTS, TO DE FOREST RADIO TELEPHONE AND TELEGRAPH COMPANY, A CORPORATION OF DELAWARE.

MEANS FOR AMPLIFYING CURRENTS.

1,375,447.   Specification of Letters Patent.   Patented Apr. 19, 1921.

Application filed June 24, 1913. Serial No. 775,529.

*To all whom it may concern:*

Be it known that I, LEE DE FOREST, a citizen of the United States, residing at New York, in the county of New York and State of New York, have invented certain new and useful Improvements in Means for Amplifying Currents, of which the following is a full, clear, and exact specification.

This invention relates to the method of and apparatus for reproducing sounds from magnetic sound records, and to the art of reproducing magnetic sound records.

More specifically, my invention contemplates the emission of sounds by apparatus, preferably electrically controlled, from magnetic material, such as a telegraphone wire or strip, or other recording material, and preferably by the use of an audion, or audion amplifier. In accordance with my invention, the telegraphone wire or other magnetic sound record is operated in suitable relationship to one or more magnets controlling an electrical circuit, whereby the magnetic variations corresponding to the recorded sounds, are transformed into electrical "sound" currents, which in turn are transformed into sound by means of a telephone receiver, a "loud-speaking" reproducer, or the like. I also contemplate the reproduction of sounds at a plurality of different locations and more or less remotely situated from the telegraphone wire or other recording material, or other magnetized sound record, and coöperating magnet or magnets. In such form of my invention, I have found it desirable to employ a master audion for electrically controlling individual audions which are connected respectively in or control the various circuits of the various telephone receivers, "loud-speaking" reproducers, or other means for reproducing sounds at the different locations. I also contemplate transferring a record from one telegraphone wire to another, by the use of one or more audions, and coöperating circuits.

Other objects and features of my invention will be understood from the following description, and the accompanying drawings, in which—

Fig. 5 indicates another method and apparatus for carrying out my method of reproducing sounds at a plurality of locations from a single telegraphone wire.

Figure 1:
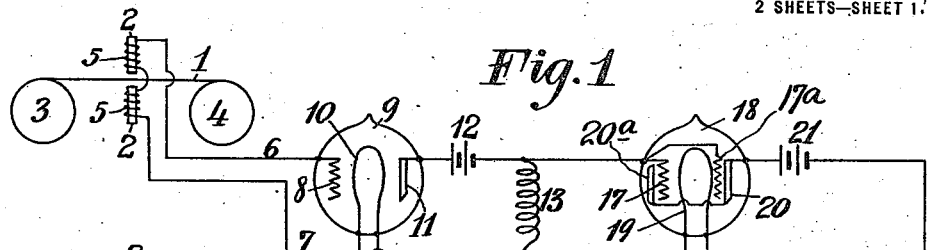
Figure 1 represents one form of my apparatus for carrying out my invention, wherein two audions are combined for reproducing sounds recorded on a telegraphone wire.
Figure 2:
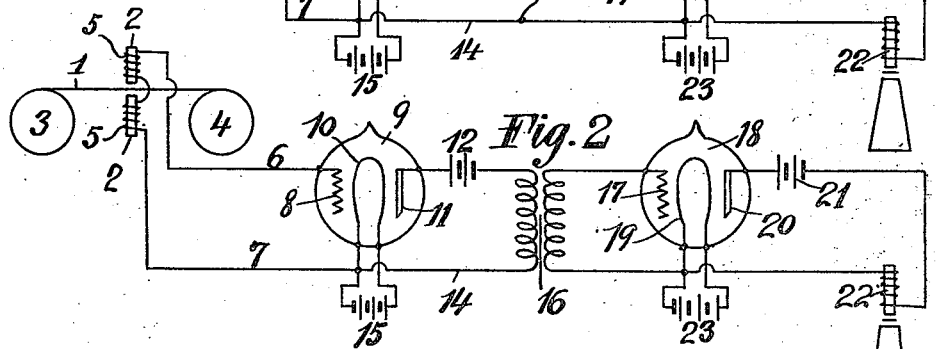
Fig. 2 is similar to Fig. 1, except that the circuits of the audions are associated by means of a two coil transformer, instead of an auto-transformer.

Referring to Figs. 1 and 2, the telegraphone wire 1 is indicated as brought in suitable proximity to the magnets 2, 2. For such purpose, the telegraphone wire may be moved at a suitable speed, such as by winding the wire 1 off of the reel 3 and onto the reel 4 by suitable mechanism, as will be understood. The magnets 2 comprise windings 5, 5, preferably of fine wire, arranged either in series or in parallel in the circuit comprising the conductors 6, 7. The conductor 6 is shown connected to the grid 8 of the audion 9, and the conductor 7 is shown connected to one terminal of the filament 10 of audion 9. The plate or "wing" 11, as indicated in Fig. 1, of audion 9 is connected through the source 12, reactance or bridging coil 13 and conductor 14 to the filament 10. The filament 10 is shown as provided with a control circuit including the source 15. The grid 17 of audion 18 is connected to one terminal of the reactance or auto-transformer 13, the other terminal of the reactance 13 being connected to one terminal of the filament 19 of audion 18, which terminal of the filament 19 is connected to the plate or "wing" 20, of audion 18, through the operating or controlling magnetic coil 22 of the telephone receiver, megaphone, or "loud-speaking" reproducer and the source 21. The filament 19 of audion 18 is connected to the source 23 in a separate circuit, which will be controlled with respect to voltage and amperage. The sources 15 and 23 are preferably storage batteries, and if desired, the two filaments may be energized by a common source, such as a storage battery. The filaments 10 and 19 may be of any suitable material which becomes incandescent at the desired temperature; I prefer to employ filaments of tantalum ordinarily, since the same gives excellent results under the usual conditions of operation. The plates or "wings" 11, 20 are preferably made of nickel, or the like. In the arrangement shown in Fig. 1, the coil 13 serves as the bridging coil of the two audion circuits, as well as functions as impedance, and may be adjusted for varying impedance.

It will be noted that Fig. 2 shows a two coil transformer 16 instead of the reactance or auto-transformer 13, and the "wing" or plate 11 of audion 9 connected to one terminal of the filament 10 through the primary coil of transformer 16. The grid 17 of audion 18 is shown connected to one terminal of the secondary of the two coil transformer 16, the other terminal of said secondary being connected to one terminal of the filament 19. In the case of either the auto-transformer of Fig. 1, or the two-coil transformer of Fig. 2, the action is the same, the function is the same and the result is the same. In both cases an electrical association is thereby accomplished between the plate element of the one audion and the grid element of the other audion, and each serves to supply reactance.

I prefer, in the arrangement shown in Fig. 2, to employ a one-to-one ratio transformer. The primary, or secondary, or both, may be constructed to be adjustable.

From the above, it will be clear that the magnetic variations recorded in the telegraphone wire 1 will be reproduced electrically in the form of weak undulatory electric currents or impulses in the fine-wire windings 5, 5 of magnets 2, 2 and thus amplified by the audion 9, which electrical amplifications are further amplified by the audion 18, and thereby reproduce sounds in the telephone receiver, megaphone or "loud-speaking" reproducer, corresponding to the original sounds recorded magnetically on the telegraphone wire 1. By suitably controlling the temperature or energization of the filaments 10 and 19, the amplification will be regulated and tonal quality of the sounds controlled.

Figure 3:
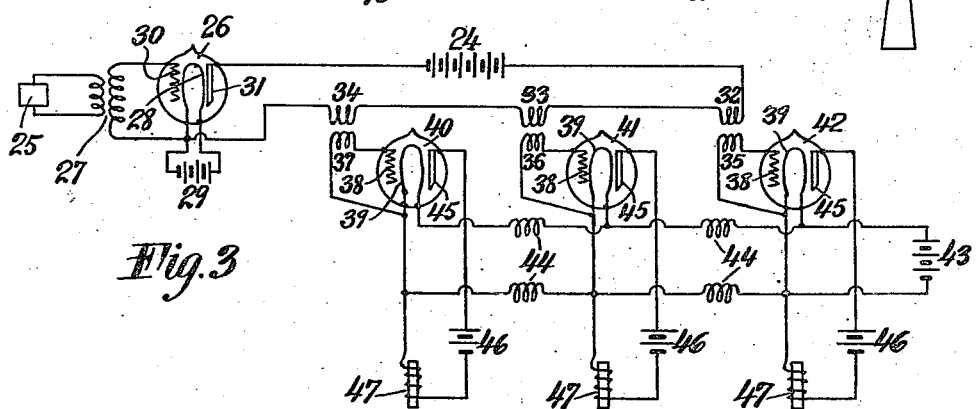
Fig. 3 shows my method and apparatus for reproducing sounds at a number of different locations from a single telegraphone record.

In Fig. 3, I have illustrated one form of my invention for reproducing sounds at a plurality of points distant from the point of location of a source of weak electric pulsating currents desired to be amplified, such as telegraphone currents, etc. The source of weak electric pulsating currents is schematically indicated at 25, and electrically connected to the master audion 26 through the two-coil transformer 27. The filament 28, preferably of tantalum, is shown energized by the source 29, such as a storage battery. The grid 30 is connected to one terminal of the transformer 27, and the plate or "wing" 31 is connected in circuit with the source 24, and in series with the primaries 32, 33, 34, etc., of the various transformers controlling the various circuits leading to the different points at which the sounds, or other indications, are reproduced. The secondaries 35, 36, 37, etc., are seen respectively connected to the grids 38 and one terminal of the respective filaments 39 of the secondary audions 40, 41, 42, etc. As shown, the filaments 39 may be controlled by a common source, such as the storage battery 43, in which case I prefer to interpose the reactances or choke coils 44 between the respective terminals of the filaments 39, to thereby prevent inter-action between the secondary audions. The plates or "wings" 45 of the auxiliary audions are connected in the respective separate circuits comprising the source 46 and operating or controlling coil 47 of the telephone receiver, "loud-speaking" reproducer, megaphone, etc. In the arrangement shown in Fig. 3, the transformer 27 is preferably a step-up transformer to raise the voltage of the pulsating current derived at 25. The master audion 26 operates to amplify the pulsations, which are transmitted by the transformer 27 to respective primaries 32, 33, 34 of the auxiliary audion circuits; the amplified pulsating currents are further amplified by the separately controlled auxiliary audions to produce the desired intensity of quality of tone or sound emitted by the telephone receiver 47, or the like. The transformers 32, 35,—33, 36,—34, 37,—are preferably one-to-one two-coil transformers. It will be understood that the reactances or choke coils 44 may be of the adjustable type, or may be of the fixed type having a predetermined reactance. It will be clear that the telephone receivers, or the like, may be located at points remote from one another as may be desired. If a high amplification of sound is desired, two or more telephone receivers, or the like, may be connected in series in the same circuit.

Figure 4:
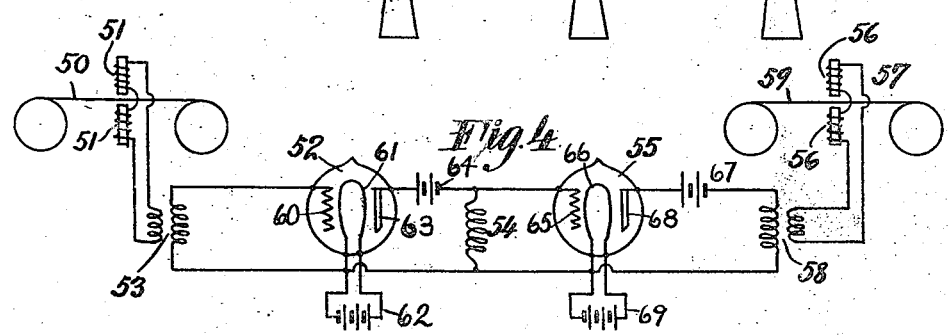
Fig. 4 shows one form or arrangement for carrying out my method of transferring a sound record from one telegraphone wire to another telegraphone wire.

In Fig. 4, I illustrate the reproducing of a magnetic sound record on one or more telegraphone wires, to thereby obtain duplicate records. The master or original telegraphone wire 50 is indicated as operated at the desired speed in suitable proximity to the telegraphone magnets 51. The magnets 51 are electrically connected to the audion, as by means of the transformer 53. The reactance 54 is connected across the line between the audion 52 and the auxiliary audion 55, the latter controlling the operating magnets 56 of the telegraphone 57, as by means of the transformer 58. The transformer 53 may be a step-up transformer, and the transformer 58 may be a step-down transformer, although I may make use of a one-to-one two-coil transformer. Thus, the pulsating currents induced in the magnets 51, 51, will be amplified by the master audion 52 and by the auxiliary audion 55, thereby producing magnetic variations in the field of the magnets 56 of the telegraphone 57 to thereby obtain a suitable magnetic record in the wire 59.

In the particular arrangement shown, the primary of the transformer 53 is connected in series with the fine-wire windings of the magnets 51, 51, and the terminals of the secondary of transformer 53 are respectively connected to the grid 60 of audion 52 and to one terminal of the filament 61, said filament being preferably of tantalum. The source 62 is connected to control the energization of the filament 61. The "wing" or plate 63 of audion 52 is connected through the source 64 to one terminal of the reactance 54, the other terminal of reactance 54 being connected to the terminal of the filament 61 to which one terminal of the secondary of transformer 53 is connected. The grid 65 of audion 55 is connected through the reactance 54 with one terminal of the filament 66 of audion 55, said terminal being also connected to a terminal of the primary of transformer 58. The remaining terminal of primary of transformer 58 is connected to the source 67 and "wing" or plate 68 of audion 55. The filament 66 is shown controlled by a separate source 69; however, if desired the filaments 61, 66, may be energized by a common source and suitably controlled to obtain the desired joint and individual functions.

It will also be clear that a plurality of telegraphones may be associated with respective auxiliary audions and a master audion, similar to the arrangement shown in Fig. 3, and thereby secure the simultaneous production of a plurality of duplicate magnetic sound records.

In accordance with the arrangement shown in Fig. 5, the weak pulsating currents are transmitted by circuit 25 through the primary of transformer 53, the secondary of which controls one or more master audions 71, 72, which in turn control local circuits, each comprising an auxiliary audion controlling a suitable sound reproducing device. I have found that it is advantageous to form the secondary of transformer 53 of one or more coils electrically interrupted by an open-circuited gap 70. If desired, a condenser may be connected between the terminals of the conductors between which the gap exists; however, under the usual conditions, a condenser is not necessary. The secondary of transformer 53 is connected to the grid element of audion 71 and also to one terminal of the filament of audion 71, the "wing" element of audion 71 being connected through primary of transformer 80 and battery 87 to said terminal of the filament 71.

One terminal of secondary of transformer 80 is connected to the grid of audion 72, and the other terminal open-circuited, or, if desired, connected to a condenser 84 and to one terminal of the filament of audion 72. However, I have found it desirable under usual conditions to omit the condenser 84 and the said connection with the filament of audion 72. The auxiliary audions 73, 74, etc., are connected in the respective local circuits and controlled by the master audions 71, 72, preferably through one-to-one two-coil transformers 81, 82, the primaries of which are electrically related in parallel. I prefer to interrupt or open-circuit one of the connections of the primaries of transformers 81, 82, to thereby secure an open-circuited gap, such as that indicated at 83. The source of electrical energy 88, such as a storage battery, is shown connected between the primaries of transformers 81, 82, and one terminal of the filament of audion 72. The battery 88 may be connected between the "wing" element of audion 72 and a primary of the transformers 81, 82. However, the interposition of the battery 88 between the filament and the primary coils of transformers 81, 82, secures superior sensitiveness and more uniform amplification for wide ranges of tone and quality of sounds. Similarly, the connection of source or battery 87 between the primary of transformer 80 and the filament of audoin 71, is preferable, under usual conditions of operation, as compared with the interposition of the souce 87 between the primary of transformer 80 and the "wing" element of audion 71.

The secondary of transformer 81 is connected at one end to the grid element of auxiliary audion 73, the other end of secondary 81 being open-circuited at 85. The secondary of transformer 82 is similarly connected at one end to the grid of auxiliary audion 74, and open-circuited at its other end, as indicated at 86. The local circuit of auxiliary audion 73 is shown embodying three electromagnetic sound reproducers 91, 92, 93, the coils of which are connected in series and further connected to the "wing" of audion 73, battery 89 and to one terminal of the filament of audion 73. Similarly, the three electroresponsive sound reproducers 94, 95, 96, arranged in series, are connected to the "wing" element of audion 74, battery 90 and to one terminal of the filament of audion 74.

The respective filaments of master audions 71, 72, and of auxiliary audions 73, 74, are shown energized by a common source of electrical energy 75, such as a storage battery, and respectively controlled by adjustable resistances 76, 77, 78, 79.

It will be clear that but a single local circuit and auxiliary audion amplifier may be used, and actuated and controlled in accordance with the arrangement indicated in Fig. 5; likewise, three or more local circuits having individual audion amplifiers may be actuated and controlled by transformers arranged in parallel with respect to a master audion. When a plurality of electromagnetic sound reproducers are employed on a local circuit, such reproducers may be positioned at different locations in a room or auditorium, whereby sounds of any desired amplification and of highly satisfactory quality will be reproduced even from so feeble a source as a telegraphone wire. I have secured excellent results in the operation of my arrangement indicated in Fig. 5 without the use of condensers at the open-circuit gaps indicated, although it is feasible to obtain amplified sounds from a telegraphone wire by the use of condensers at said open-circuited gaps. It is advantageous to arrange the grids of the several audions so that the same are not connected to a source of direct current electromotive force, and thereby markedly improve the sensitiveness of the apparatus.

I have discovered that the sensitiveness of the audion is improved by employing a plurality of grids and a plurality of wings, preferably by disposing each grid between a wing and the filament. In the audion 18, see Fig. 1, I have indicated a record grid 17$^a$ disposed between the wing 20 and the filament 19, and a second wing 20$^a$ disposed to one side of the grid 17 and opposite the filament 19, so that the grid 17 is disposed between the wing 20$^a$ and filament 19. In a similar manner, the audions, each or all, as desired, may be provided with a plurality of grids and a plurality of wings, and thereby improve the sensitiveness of operation of the respective arrangements indicated in Figs. 1 to 5, inclusive.

From the above, it will be seen that my method and apparatus contemplates the transmission of relatively weak electric pulsating currents which are amplified by the use of an audion, the amplification of which is controlled independently of the strength, frequency, amplitude, etc., of the pulsating currents. Whereas, I have illustrated particular forms of my apparatus and wherein my method may be carried out, it will be understood that modifications and changes may be made therein without departing from the scope of my invention. The circuit leads from the source of the undulatory electric currents to the first audion may be regarded and termed line wire or receptor connections, and as shown, the current flow therein is unilateral. The audion bulbs, as shown, and as usual, are evacuated vessels in each of which are disposed the filament, the plate or "wing" and the grid. In operation each filament is a cathode and when heated from the source of current in circuit therewith emits negative ions. Each plate or "wing" is an anode and the function of the grids is to form a screen. By impressing undulatory electric currents upon the grids, as, for instance, by connecting the source of undulatory current or the receptor lead thereto, or by connecting electrically the grid or screen of one audion with the plate or anode of another, the potentials of the grids are varied correspondingly to the undulations of the currents so impressed thereon. Since the audion bulbs are evacuated the elements disposed therein are surrounded by a gaseous conducting space, and it is in this space between the cathode and anode elements that the ionization takes place when the cathode or filament is heated thereby forming a conducting path between the cathode and anode and in the local circuit which includes these elements and also a source of external unidirectional electro-motive force such as the batteries 12, 24, 64, 87, 88, 89, 90. These batteries, of course serve to maintain a difference of potential between the anodes and screens or other elements to which their terminals are connected.

In the case of Figs. 3, 4, and 5, the secondaries of transformers 27 and 53 are connected at their respective terminals to the grip or screen and filament or cathode elements, respectively, of their associated audion bulbs through leads or receptor connections in the same way as in the case of the leads 6, 7, of Figs. 1 and 2.

Having thus described my invention, what I claim as new and desire to secure by Letters Patent of the United States is:—

1. The combination with a source of weak undulatory current, of an electric circuit including a source of current, means to vary the conductivity of said circuit by and in accordance with said undulatory current, a reactance connected across said circuit, and an audion conductively connected with said circuit.

2. The combination with a source of weak undulatory current, of a vessel having therein an anode and a cathode separated from each other, and a grid or screen, said source of undulatory current being connected to said grid or screen to vary the conductivity of the space between said anode and cathode by and in accordance with said undulatory current, a circuit including therein said anode and cathode, and a source of current, a second vessel containing a cathode an anode and a grid or screen, said circuit being conductively connected to said second grid or screen, a second circuit including therein said second anode and cathode and a separate source of current, and a translating device associated with said second circuit.

3. Apparatus for receiving or relaying electric signals, having, in combination, an evacuated vessel, a cathode having provision for emitting negative ions, and an anode and its screen inclosed in said vessel, a second evacuated vessel, a second cathode having provision for emitting negative ions, and a second anode, means for conducting signal impulses to the first screen to vary its potential, a local circuit including a source of electromotive force and a conductive electrical connection between the first anode and second screen, and a second circuit having a connection with a signal indicating device and including a source of electromotive force and a connection between the second cathode and second anode.

4. Apparatus for receiving or relaying electric signals, having, in combination, at least one cathode, having provision for emitting negative ions, an anode, a screen in proximity to the anode, a second anode, a second screen in proximity to the second anode, said elements being surrounded by gaseous conducting space, means for conducting the electric signal impulses to the first screen to vary its potential, a local circuit including a source of electromotive force and a conductive electrical connection between the first anode and second screen, and a second circuit connected with a signal indicating device and including a source of electromotive force and a connection between the second anode and a cathode.

5. Apparatus for receiving or relaying electric signals, having, in combination, at least one cathode, a plurality of anodes and screens therefor, said elements being surrounded by gaseous conducting space, a receptor connection to one screen, a conductive electrical connection between another screen and an anode, and a connection from another anode and a cathode to a signal indicating device.

6. Apparatus for receiving or relaying electric signals, having, in combination, an evacuated vessel, a cathode, anode and screen inclosed therein, a second evacuated vessel and a second cathode, anode and screen inclosed therein, a receptor connection to the first screen, a conductive electrical connection between the second screen and first anode, and a connection from the second anode and second cathode to a signal indicating device.

7. Apparatus for receiving or relaying electric signals, having, in combination, at least one cathode having provision for emitting negative ions, an anode, a screen in proximity to the anode, a second anode, a second screen in proximity to the second anode, said elements being surrounded by gaseous conducting space means for varying the potential of the first screen in response to the received signal impulses, means including a conductive electrical connection from the first anode to the second screen and an internal unidirectional source of electromotive force in the connection for maintaining a difference of potential between the second screen and first anode and having provision for causing variations in the potential of the second screen corresponding to variations in the potential of the first screen and means having a connection with a signal indicating device for causing an electric current to flow between the second anode and a cathode.

8. Apparatus for receiving or relaying electric signals, having, in combination, an evacuated vessel, a cathode having provision for emitting negative ions and an anode and its screen inclosed in said vessel, a second evacuated vessel, a second cathode having provision for emitting negative ions and a second anode and its screen inclosed in said second vessel, means for varying the potential of the first screen in response to the received signal impulses, means including an external unidirectional source of electro-motive force for maintaining the second screen at a different potential from the second cathode and having provision for causing variations in the potential of the second screen corresponding to variations in the potential in the first screen, and means having a connection with a signal indicating device for causing an electric current to flow between the second anode and the second cathode.

9. Apparatus for receiving or relaying electric signals having, in combination at least one cathode having provision for emitting negative ions, an anode and its screen, a second anode and its screen, said elements being surrounded by gaseous conducting space, a connection to the first screen for causing variations in its potential corresponding to the received signal impulses, a local circuit including a connection between the first anode and second screen and a source of electromotive force for maintaining a difference of potential between the second screen and first anode, and a connection between the second anode and a cathode including a source of electromotive force.

10. Apparatus for receiving or relaying electric signals, having, in combination, an evacuated vessel, a cathode having provision for emitting negative ions and an anode and its screen inclosed therein, a second evacuated vessel, and a second cathode having provision for emitting negative ions and an anode and its screen inclosed therein, a connection to the first screen for causing variations in its potential corresponding to the received signal impulses, a local circuit including a connection between the first anode and second screen and a source of electromotive force for maintaining a second screen at a potential negative with respect to the second cathode, and a connection between the second anode and second cathode including a source of electromotive force.

11. Apparatus for receiving or relaying electric signals, having in combination, at least one cathode having provision for emitting negative ions, a plurality of anodes and their screens, a receiving connection to one screen, a conductive electrical connection between another screen and the anode which is adjacent the first screen, and a connection from another anode and a cathode to a signal indicating device.

12. Apparatus for receiving or relaying electric signals, having, in combination, an evacuated vessel, a cathode having provision for emitting negative ions, and an anode and its screen in proximity to the cathode inclosed within said vessel, means for maintaining the screen at a negative potential with respect to the cathode by a current supplied through a similar evacuated vessel and for superimposing on said negative potential variations in potential corresponding to the signal impulses and means including a connection to a signal indicating device for causing an electric current to flow between the cathode and anode.

13. Apparatus for receiving or relaying electric signals, having, in combination an evacuated vessel, a cathode having provision for emitting negative ions and an anode and its screen adjacent the cathode inclosed within said vessel, means tending to cause a current to flow between the anode and the cathode, means including a source of electromotive force and a partly gaseous path for normally maintaining the screen at a potential negative with respect to the cathode, and means for causing variations in the potential of the screen corresponding to the signal impulses.

14. Apparatus for receiving or relaying electric signals, having, in combination, an evacuated vessel, a cathode having provisions for emitting negative ions and an anode and its screen inclosed in said vessel, a second evacuated vessel, a second cathode having provision for emitting negative ions and a second anode and its screen inclosed in the second vessel, means for causing variations in the potential of the first screen corresponding to the signal impulses, a circuit across the evacuated space from the first cathode to the first anode, along a wire connection to the second screen, across the evacuated space from the second screen to an adjacent electrode and back along a wire connection to the first cathode, such circuit including a source of electromotive force tending to cause a negative current to flow from the first cathode to the first anode, and a second circuit across the evacuated space from the second cathode to the second anode, said circuit including a connection to a signal indicating device and a source of electromotive force for causing a negative current to flow from the second cathode to the second anode.

15. Apparatus for receiving or relaying electric signals, having, in combination, a local circuit including a source of electromotive force, an amplifier including a plurality of electrodes surrounded by a gaseous conductor, and connected with the local circuit and operating to produce impulses in the local circuit corresponding to but of greater intensity than the received signal impulses, a second circuit including a source of electromotive force and a connection with a signal detecting device, and a second amplifier including a plurality of electrodes surrounded by a gaseous conductor, said second amplifier being conductively electrically connected with both circuits and operating to amplify the current impulses in the second circuit corresponding to but of greater intensity than the impulses in the first local circuit.

16. Apparatus for receiving or relaying electric signals, having, in combination, a local circuit including a source of electromotive force, an amplifier including a cathode, anode and screen surrounded by a gaseous conductor, said amplifier having a connection from its anode and cathode to the local circuit and a connection for leading the received impulses to its screen and operating to produce impulses in the local circuit corresponding to but of greater intensity than the received signal impulses, a second circuit including a source of electromotive force and a connection to a signal detecting device, and a second amplifier including a cathode, anode and its screen surrounded by a gaseous conductor and having its cathode and anode connected to the second local circuit and its screen conductively electrically connected to the first local circuit and operating to amplify the impulses in the first local circuit to produce impulses in the second local circuit corresponding to but of greater intensity than in the first local circuit.

17. The combination, with the line wire, of apparatus for receiving or relaying electric signals transmitted over wires, comprising an evacuated vessel, a cathode, anode and its screen inclosed therein, and a unilateral connection between the apparatus and the line wire.

18. The combination, with the line wire, of apparatus for receiving or relaying electric signals transmitted over wires, comprising a cathode having provision for emitting negative ions, an anode, and its screen in proximity to the cathode, said elements being surrounded by a gaseous conductor, a connection between the cathode and anode including a source of electromotive force, and a unilateral connection between the apparatus and the line wire consisting of a receptor lead connected to the screen.

19. The combination, with the line wire, of apparatus for receiving or relaying electric signals transmitted over wires, comprising an evacuated vessel, a cathode, anode and screen inclosed therein, a connection between the cathode and anode including a source of electromotive force, a transformer having its primary in series with the line wire, and a unilateral connection between the transformer and the apparatus consisting of a receptor connection from one terminal of the transformer secondary to the screen, the other terminal of the secondary being unconnected with the apparatus.

20. The combination with a magnetic sound record, means to generate an alternating electric current by and in accordance with said record, an audion having a filament, an anode and a grid disposed therein, a circuit connection to impress said alternating current upon said grid, an energizing circuit for the filament, a second audion having a filament, an anode and a grid, a circuit connection including the anode and filament of the first audion conductively connected to the grid and filament of the second audion, and a source of current, and a local circuit including the anode and filament of the second audion and a source of current.

21. The combination with a source of current, of a plurality of audions conductively connected in series, the input circuit of the first of said audions being associated with said source of current, and an independent source of current connected to the output electrode of each of said audions.

22. The combination with a source of current, of a series of audions, the input electrode of the first of said audions in the series being associated with said source of current, the output electrode of the first audion of the series being conductively connected to the input electrode of the next audion of the series, and a separate source of current for the output electrode of each of said audions.

23. The combination with a source of current, of a series of audions, the input electrode of the first of said audions in the series being associated with said source of current, the output electrode of the first audion of the series being conductively connected to the input electrode of the next audion of the series, a separate source of current for the output electrode of each of said audions, and a signal indicating device associated with the output electrode of the last audion of the series.

24. An electrical amplifying system comprising a vacuum tube device having anode and cathode electrodes, means for supplying a space current between said electrodes, means for controlling said space current in accordance with an impulse to be transmitted, an impedance in circuit with said electrodes, and an amplifier conductively connected to said impedance.

25. An electrical amplifying system comprising a vacuum tube device having an anode and a cathode, an impedance, means for supplying current through said impedance and between said electrodes, means for controlling said current in accordance with an impulse to be transmitted, an amplifier having an input circuit and an output circuit, said input circuit being conductively connected and responsive to the potential variations across said impedance, and a receiving device connected to said output circuit.

26. Means for amplifying the alternating current component of a unidirectional current comprising an electron discharge device having plate and grid circuits, one of said circuits containing a source of current to be amplified, and an impedance conductively included in the circuit of the source of current to be amplified and included in the grid circuit through which the current to be amplified is caused to flow.

27. Means for amplifying the alternating current component of a unidirectional current comprising an electron discharge device having plate and grid circuits, one of said circuits containing a source of current to be amplified, and a reactance conductively included in the circuit of the source of current to be amplified and included in the grid circuit through which the current to be amplified is caused to flow.

28. An electrical amplifying system comprising a vacuum tube device having anode and cathode electrodes, means for supplying a space current between said electrodes, means for controlling said space current in accordance with an impulse to be transmitted, a reactance in circuit with said electrodes, and an amplifier conductively connected to said reactance.

29. A multi-stage amplifier comprising a plurality of vacuum tube devices each having an anode, a cathode and a control circuit, another circuit comprising a source of current and a reactance connected to the anode and cathode of one of said devices, and a conductive connection from said reactance to the control circuit of another of said devices.

In testimony whereof I affix my signature, in presence of two witnesses.

LEE DE FOREST.

Witnesses:
 HENRY J. LUCKE,
 GEO. N. KERR.